United States Patent
Arita et al.

[11] Patent Number: 6,122,040
[45] Date of Patent: Sep. 19, 2000

[54] SYSTEM AND METHOD OF DETECTING DEVIATION OF AN AXIS AND ADJUSTING THE AXIS OF A RANGE FINDER

[75] Inventors: Satoru Arita; Wataru Ishio, both of Kyoto; Hayato Kikuchi, Saitama, all of Japan

[73] Assignees: Omron Corporation, Kyoto; Honda Giken Kogyo Kabushiki Kaisha, Tokyo, both of Japan

[21] Appl. No.: 09/182,990

[22] Filed: Oct. 30, 1998

[30] Foreign Application Priority Data

Nov. 6, 1997 [JP] Japan .................................. 9-304584

[51] Int. Cl.[7] .............................. G01C 3/08; B60T 7/16; B62D 1/24
[52] U.S. Cl. .................. 356/4.01; 356/5.01; 356/5.1; 356/141.1; 180/169
[58] Field of Search ................... 356/4.01, 5.01–5.15, 356/141.1; 180/169

[56] References Cited

U.S. PATENT DOCUMENTS

| | | |
|---|---|---|
| 4,632,543 | 12/1986 | Endo . |
| 5,159,557 | 10/1992 | Ogawa . |
| 5,202,742 | 4/1993 | Frank et al. .............. 180/169 |
| 5,313,262 | 5/1994 | Leonard ................... 180/169 |
| 5,648,905 | 7/1997 | Izumi et al. . |
| 5,751,211 | 5/1998 | Shirai et al. .............. 340/435 |

FOREIGN PATENT DOCUMENTS 9-304535  11/1997  Japan .

Primary Examiner—Stephen C. Buczinski
Attorney, Agent, or Firm—Dickstein Shapiro Morin & Oshinsky LLP

[57] ABSTRACT

A plurality of pieces of detection data of a preceding vehicle, which have been collected in a straight line running state in which a self-vehicle and a preceding vehicle are running straight on the same straight line, are extracted as effective detection data. Setting of an inside parameter is automatically changed so that a center of the detection area can coincide with an average center of the preceding vehicle obtained by a statistical treatment of the plurality of pieces of detection data. The above automatic adjusting function is provided in a control circuit 7 of the range finder, and while the self-vehicle is stably running straight on the same straight line while chasing the preceding vehicle, and optical axis adjustment is conducted by operating the automatic adjusting function of the control circuit 7.

52 Claims, 6 Drawing Sheets

IMAGE VIEW OF DIVISION OF TARGET

SYSTEM AND METHOD OF DETECTING DEVIATION OF AN AXIS AND ADJUSTING THE AXIS OF A RANGE FINDER

BACKGROUND OF THE INVENTION

1. Field of the Invention

The present invention relates to a technique for adjusting a position of a detection area and detecting a positional deviation, in a range finder incorporated into a vehicle by which a distance to an object to be detected such as a preceding vehicle is measured by utilizing waves such as laser beams.

2. Description of the Related Art

Conventionally, they have extensively developed radar to be incorporated into a vehicle for monitoring an obstacle located ahead and for controlling running in chase of a preceding vehicle. Concerning the system of the radar, an electric wave system and a laser beam system are well known. In the above systems, waves of electric waves or laser beams are sent to an object to be detected located in a predetermined area, and a distance from the vehicle to the object to be detected can be found by a propagation delay time between a time at which a signal of the waves has been emitted and a time at which a reflecting signal of the waves has been received.

For example, in the case of a range finder of the laser beam system, that is, in the case of a so-called laser radar, the propagation delay time is measured as follows. While scanning is being conducted on a predetermined scanning area, the laser beams are irradiated thereon. In order to find the propagation delay time between the emitted laser beams and the reflected laser beams, light emitting timing is made by a control circuit, and a counter starts in accordance with the light emitting timing. Simultaneously, a laser diode (hereinafter referred to as "LD") is driven by a laser diode drive circuit, so that the laser beams can be emitted. The laser beams reflect on the object to be detected and return to the range finder. The laser beams thus returned are received by a photo diode (hereinafter referred to as "PD"). In the case where reflected laser beams, the intensity of which is higher than a light reception threshold level, are obtained, the timing is taken into a control circuit, and the counter stops, so that the propagation delay time can be measured.

On the other hand, a direction in which the object to be detected is located is judged according to a scanning angle at the laser beam emitting timing or the reflected laser beam receiving timing.

According to distance data thus measured from the range finder to the object to be detected, direction data, the data of received light and vehicle speed data obtained by a vehicle speed sensor, the individual pieces of the distance data are grouped and made to correspond to the previous data, so that a relative speed to the object to be detected is calculated. Then it is judged what is the object, for example, it is judged whether the object is a car, a bike, a man, a billboard, or a reflector located on a roadside, and an object to be followed is specified and an object to be warned is specified.

In the range finder of this type, in the case where the range finder is actually attached to the vehicle, when an actual detecting area deviates from an ideal detecting area to detect the object to be detected such as the preceding vehicle, that is, when an angle region, in which reflected waves are received and the above measurement is conducted, deviates from an angle region, which extends in front of the vehicle in the transverse direction, reliability of the measurement result is deteriorated in accordance with the deviation. Accordingly, in order to keep a condition in which the above deviation is not caused, it is necessary to conduct axis adjustment, which is referred to as an optical axis adjustment work in the case of a laser radar, in which a center of the detection area is adjusted, on a production line of vehicles or in a garage at the time of inspection of vehicles.

As conventional methods of adjusting a position of the detection area, which will be also referred to as "axis adjustment" hereinafter, there is provided a method in which a level is used to adjust an attaching angle of a detection head of the range finder, that is, to adjust an angle in the vertical direction.

Also, there is another method in which the range finder is incorporated into the vehicle which is in a stopped state, a reference target, which is a reference reflecting body prepared specially, is disposed at the center of an ideal detecting area, and an excellent environment having no disturbance in which any objects except for the reference target are not detected is prepared, and then the range finder is actually operated, and for example, the attaching angle of the detection head of the range finder and a parameter of the inside are changed so that position data of the reference target to be detected can coincide with the center of the detection area.

However, the following problems may be encountered in the above conventional axis adjusting techniques.

(1) In the method in which the level is used for adjusting the axis, it is impossible to conduct adjustment in the transverse direction.

(2) In the method in which the specially prepared reference target is disposed at an appropriate position and the axis adjustment is conducted, it is necessary for a worker to have a pretty high skill for adjustment, and further it takes very long time for adjustment. That is, in order to position the reference target at an ideal position with high accuracy, it is necessary to prepare a special jig and further high skill is required. Further, it is necessary to readout position data of the reference target, and also it is necessary to change the attaching angle of the detection head and the parameter of the inside so that the position data of the reference target can coincide with the center of the detection area. For the above reasons, it is necessary for a worker to receive a pretty high education and to have the pretty high skill.

(3) Further, the above method in which the reference target is used is disadvantageous as follows. According to the above method, the vehicle stops, and adjustment is conducted under the condition that the reference target is disposed on the central axis of a body of the vehicle. Therefore, a difference between the actual advancing direction of the vehicle and the above central axis surely becomes an error, and accuracy is deteriorated due to the above error.

That is, the body of the vehicle is not necessarily directed to the advancing direction. Although it is impossible for a man to recognize such the difference, a minute angle accuracy of several milliradian is required for this type range finder. Therefore, the above difference causes a problem.

(4) Further, by using only the conventional adjusting techniques, it is difficult to keep the center of the detecting area at the appropriate position. That is, when the range finder is in a stationary condition, for example, when the range finder is shipped from a factory, it is kept in the stationary condition. At this time, it is possible to adjust the axis of the range finder with accuracy. However, after the shipment from the factory, it is conveyed over a long period of time and some shocks are given to the range finder. For the above reasons, there is a possibility that the detecting area deviates, that is, there is a possibility that the axis of the range finder deviates from a predetermined position. In this case, unless the axis adjustment is conducted again in a periodical checkup, the range finder continues to be used while the detecting area is deviated from the appropriate position. For the above reasons, there is a demand of developing a detection technique by which deviation of the optical axis can be easily detected.

In this connection, in Japanese Patent Application No. Hei 8-114483, the present applicant has proposed a technique by which the above axis adjustment can be automatically conducted while the vehicle is running. This technique is summarized as follows. While the vehicle is running, it is automatically recognized whether or not detection data of the preceding vehicle can be used as a reference of the axis adjustment. When it is recognized that the detection data can be used as the reference of the axis adjustment, the inside parameter (set position data of the detection area) is automatically changed by the control processing function in accordance with the detection data of the preceding vehicle.

According to the above technique, it is possible to conduct the axis adjustment without using the special jig or skill, and further the axis adjustment is not affected by a factor of disturbance, that is, the axis adjustment can be automatically conducted while an user is not aware of it. However, even if the above technique is applied, it takes long time to conduct the axis adjustment. Accordingly, there is a demand of reducing the axis adjustment time.

The reason why the long time is required for conducting the axis adjustment is described as follows. The detection data of common preceding vehicles are not constant, for example, even when the preceding vehicle is running on a straight road, the detection data somewhat changes. Further, it is difficult to precisely judge that both the preceding vehicle and the self-vehicle are running on the straight road stably, and it is difficult to obtain correct data. Therefore, in order to conduct the adjustment with high accuracy, it is necessary to collect a large number of pieces of detection data of the preceding vehicle over a pretty long period of time, for example, for about two hours, so that an average can be used as reference data (the most appropriate position of the center of the detection area).

For the above reasons, the technique disclosed in the aforementioned Japanese Patent Application is disadvantageous in that it is not preferable to use the technique as the method of adjusting the axis at the shipment from the factory or at the time of periodical checkup. The reason is that the axis adjustment requires the long time, which causes an increase in personnel expenses, that is, the manufacturing cost and the maintenance cost are increased. Therefore, it is desired to provide an adjusting method and an apparatus for the adjustment which can be used by a skilled worker in the case of shipment from the factory or in the case of periodical maintenance.

When there is a large deviation of the axis in the transverse direction which can not be adjusted by changing the inside parameter, or when there is the deviation of the axis in the vertical direction, it is impossible for the technique disclosed in the above Japanese Patent Application to meet the requirement. Therefore, it is desired to provide a technique by which the aforementioned deviation of the axis can be automatically detected.

SUMMARY OF THE INVENTION

Therefore, it is a first object of the present invention to provide a range finder and an axis adjusting method of the range finder, in which the axis adjustment especially in the transverse direction can be easily realized in a short period of time with high accuracy.

It is a second object of the present invention to provide a range finder and an axis adjusting method of the range finder, in which the working time can be reduced as short as possible in accordance with the working condition Further, it is a third object of the present invention to provide a range finder and an axis adjusting method of the range finder, in which the axis deviation in the transverse and the vertical direction can be easily detected.

As follows, there are provided methods and range finders to achieve the above objects.

According to a first aspect of the invention, there is provided a method of adjusting an axis of a range finder incorporated into a vehicle in which waves is irradiated on a predetermined detection area in front of the vehicle while scanning is conducted and detection data including at least positional information on an object to be detected located in the detection area is judged and outputted in accordance with the waves reflected on the object to be detected, in which the method is an axis adjusting method of adjusting a center of the detection area at an appropriate position, in which a self-vehicle into which the range finder is incorporated is made to run straight on the same straight line following a preceding vehicle which is running straight, a plurality of pieces of detection data of the preceding vehicle are obtained by the range finder, the appropriate position is judged as an average center of the preceding vehicle obtained by statistically treating the plurality of pieces of detection data of the preceding vehicle, and a parameter of the detection area of the range finder is changed so that the center of the detection area can coincide with the appropriate position.

According to a second aspect of the invention, there is provided a method of detecting deviation of an axis of a range finder incorporated into a vehicle in which waves is irradiated on a predetermined detection area in front of the vehicle while scanning is conducted and detection data including at least positional information on an object to be detected located in the detection area is judged and outputted in accordance with the waves reflected on the object to be detected, in which the method detects deviation of the axis of the range finder from an appropriate position, in which the vehicle into which the range finder is incorporated is made to run straight on the same straight line following a preceding vehicle which is running straight, a plurality of pieces of detection data of the preceding vehicle are obtained by the range finder, the appropriate position is judged as an average center of the preceding vehicle obtained by statistically treating the plurality of pieces of detection data of the preceding vehicle, and deviation from the appropriate position in the detection area is detected when the appropriate position and the center of the detection area are compared with each other.

According to a third aspect of the invention, there is provided a method of detecting deviation of an axis of a range finder incorporated into a vehicle in which waves are irradiated on a predetermined detection area in front of the vehicle while scanning is conducted and detection data including at least positional information on an object to be detected located in the detection area is judged and outputted in accordance with the waves reflected on the object to be detected, the method detects deviation of an axis of the range finder from an appropriate position, in which the vehicle into which the range finder is incorporated is made to run on a straight road, on the side of which a reflecting body is disposed, a change with time of detection data of the reflecting body disposed on the side of a road obtained by the range finder is observed for a predetermined period of time, and the detection area is judged that it deviates from the appropriate position in the transverse direction when a quantity of movement of the reflecting body in the transverse direction exceeds a setting value in the observation.

According to a fourth aspect of the invention, there is provided a method of detecting deviation of an axis of a range finder incorporated into a vehicle in which waves are irradiated on a predetermined detection area in front of the vehicle while scanning is conducted and detection data including at least positional information on an object to be detected located in the detection area is judged and outputted in accordance with the waves reflected on the object to be detected, in which the method detects deviation of an axis of the range finder from an appropriate position, in which it is judged that a center of the detecting area deviates from the appropriate position in the vertical direction when the object to be detected can not be continuously detected in a period of time exceeding a predetermined period of time.

According to a fifth aspect of the invention, there is provided a range finder incorporated into a vehicle in which waves are irradiated on a predetermined detection area in front of a vehicle while scanning is conducted and detection data including at least positional information on an object to be detected located in the detection area is judged and outputted in accordance with the waves reflected on the object to be detected, in which only a plurality of pieces of detection data of a preceding vehicle, which have been collected when the vehicle into which the range finder is incorporated and the preceding vehicle running in front of the vehicle are running straight on the same straight line, are extracted as effective data for a predetermined period of time, and setting of a parameter of the detecting area is changed so that a center of the detecting area can coincide with an average center of the preceding vehicle obtained when the plurality of effective extracted data are statistically treated.

According to a sixth aspect of the invention, there is provided a range finder incorporated into a vehicle in which waves are irradiated on a predetermined detection area in front of a vehicle while scanning is conducted and detection data including at least positional information on an object to be detected located in the detection area is judged and outputted in accordance with the waves reflected on the object to be detected. The range finder comprise a processing means, in which only a plurality of pieces of detection data of a preceding vehicle, which have been collected when a self-vehicle into which the range finder is incorporated and the preceding vehicle running in front of the self-vehicle are running straight on the same straight line, are extracted as effective data for a predetermined period of time, and deviation of the detecting area from an appropriate position is detected when an average center of the preceding vehicle obtained when the plurality of effective extracted data are statistically treated are compared with a center of the detecting area.

According to a seventh aspect of the invention, there is provided a range finder comprises a mode changing over means for changing over a collecting time to collect the effective detection data at least between a long collecting time and a short collecting time.

According to an eighth aspect of the invention, there is provided a range finder, in which the processing means judges that the self-vehicle and the preceding vehicle are running straight on the same straight line under the condition that a running direction of the self-vehicle detected by a sensor such as a steering angle sensor or a yaw rate sensor at the time of collecting detection data is straight and also under the condition that a running direction of the self-vehicle detected by the steering angle sensor or the yaw rate sensor after a predetermined time has passed from the time of collecting detection data is straight, and detection data of the preceding vehicle not satisfying the above conditions is excluded as unavailable data.

According to a ninth aspect of the invention, there is provided a range finder, in which the processing means judges that the self-vehicle and the preceding vehicle are running straight on the same straight line under the condition that a running direction of the self-vehicle detected by a sensor such as a steering angle sensor or a yaw rate sensor at the time of collecting detection data is straight and also under the condition that a running direction of the self-vehicle detected by the sensor is straight when the self-vehicle has reached a position at which the preceding vehicle was estimated to be located at the time of collecting detection data, and detection data of the preceding vehicle not satisfying the above conditions is excluded as unavailable data.

According to a tenth aspect of the invention, there is provided a range finder, in which the processing means judges that the self-vehicle and the preceding vehicle are running straight on the same straight line under the condition that a running direction of the self-vehicle detected by a sensor such as a steering angle sensor or a yaw rate sensor at the time of collecting detection data is straight and also under the condition that a position of the preceding vehicle in the transverse direction is continuously detected at one of the positions close to each other for a predetermined setting time, and detection data of the preceding vehicle not satisfying the above conditions is excluded as unavailable data.

According to an eleventh aspect of the invention, there is provided a range finder incorporated into a vehicle in which waves are irradiated on a predetermined detection area in front of a vehicle while scanning is conducted and detection data including at least positional information on an object to be detected located in the detection area is judged and outputted in accordance with the waves reflected on the object to be detected. The range finder comprises a processing means, in which a change with time of detection data of a reflecting body disposed on the side of a road on which the self-vehicle is running is observed for a predetermined period of time when the self-vehicle into which the range finder is incorporated is running, and it is judged that the detection area deviates from an appropriate position when a distance of movement of the reflecting body in the transverse direction exceeds a predetermined value in the process of observation.

According to a twelfth aspect of the invention, there is provided a range finder incorporated into a vehicle in which waves are irradiated on a predetermined detection area in front of a vehicle while scanning is conducted and detection data including at least positional information on an object to be detected located in the detection area is judged and outputted in accordance with the waves reflected on the object to be detected. The range finder comprises a processing means, in which it is judged that a center of the detection area deviates from an appropriate position in the vertical direction when an object to be detected can not be continuously detected in a period of time exceeding a setting time.

DETAILED DESCRIPTION OF THE PREFERRED EMBODIMENTS

Embodiments of the present invention will be given as follows referring to the accompanying drawings.

Figure 1:
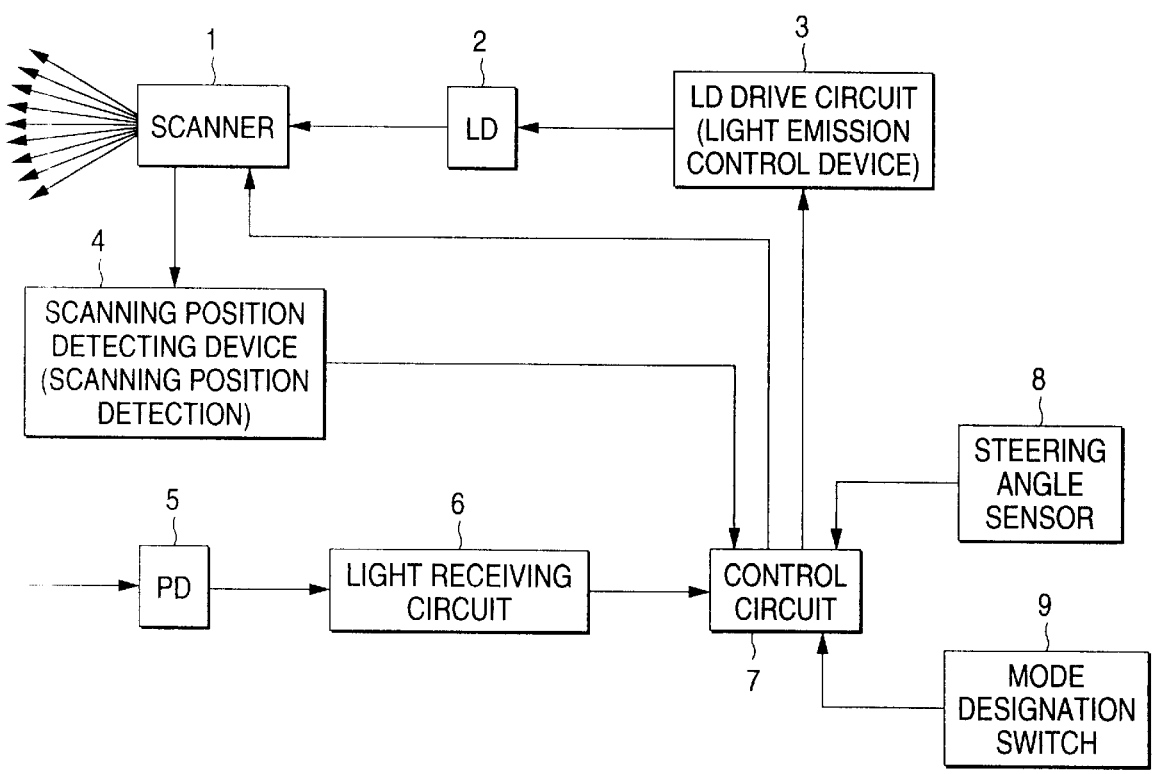
FIG. 1 is a block diagram showing an example of the arrangement of a range finder.

FIG. 1 is a block diagram showing an overall arrangement of the range finder of this example. As shown in FIG. 1, the range finder of this example includes a scanner 1, a LD 2, a LD drive circuit 3, a scanning position detector 4, a PD 5, a light reception circuit 6, a control circuit 7 (processing means), a steering angle sensor 8, and a mode designation switch 9 (mode changeover operation means).

The scanner 1 is formed of a device operated in such a manner that laser beams emitted from the LD 2 are put into a scanning motion at a predetermined angle by a reflecting mirror (not shown) which is oscillated so that predetermined scanning operation can be conducted, in which the laser beams are irradiated on the scanning area. The scanner 1 is controlled by the control circuit 7, so that it can be operated at a predetermined timing and period.

The LD drive circuit 3 is controlled by the control circuit 7 and drives the LD 2 at a light at each of a light emitting timing made by the control circuit 7 so that laser beams can be outputted from the LD 2.

The scanning position detector 4 detects a scanning direction of the scanner 1 and inputs the obtained signal (scanning direction signal) into the control circuit 7.

The PD 5 receives reflected laser beams which have been irradiated and reflected on an object to be detected. In accordance of a quantity of received light, the PD 5 outputs an electric signal, which will be referred to as a signal of the quantity of received light hereinafter. The signal of the quantity of received light outputted from the PD 5 is inputted into the control circuit 7 via the light reception circuit 6.

The control circuit 7 is comprised by a microcomputer, which will be referred to as a "micon" hereinafter, including CPU, ROM and RAM. In the normal operation of this range finder, the range finding motion is basically conducted according to the following control processing.

That is, the scanner 1 and the LD drive circuit 3 are controlled as described above, and a distance from the range finder to the object to be detected is calculated according to the propagation delay time from light emitting to light receiving. At this time, a direction of the object to be detected is judged by the scanning direction. Further, the quantity of received light is judged by an intensity of received light (an amount of the signal of the received light). By the thus obtained data as the distance, direction and the quantity of received light, the object to be detected is discriminated and the moving condition of the object is judged, and detection data including information on the type of the object to be detected, information on the position and information on the profile is outputted.

The steering sensor 8 is formed of a well-known sensor to detect a steering angle, that is, an operating angle of the steering device. It is possible to utilize a yaw rate sensor or a wheel speed sensor instead of the steering angle sensor 8. In this connection, the yaw rate sensor is also a well-known sensor to detect a yaw rate of a vehicle. In any case, whether the vehicle is running straight or not can be detected in the control circuit 7 by the detection signals of these sensors.

The mode designation switch 9 is formed of an operation switch capable of being operated by at least a technical worker who is a man conducting inspection at the time of shipment of the vehicle from a factory or conducting repairs after shipment. The mode designation switch 9 gives a command of an automatic adjusting mode of the optical axis to the control circuit 7. In this case, the automatic adjusting mode of the optical axis is a common mode or a short period mode which will be described later.

In this connection, the mode designation switch 9 may be disposed in a driver's seat of the vehicle so that a common user of the vehicle can operated it. However, the optical axis adjustment in the short period mode, which will be described later, is effective when the adjustment condition is good. Therefore, in order to avoid the misuse of the mode designation switch 9 by a user incapable of recognizing the necessity of setting such an adjusting condition, it is preferable that the mode designation switch 9 is disposed in such a manner that the common user can not operate it easily and the mode designation switch 9 is usually set at the common mode.

Figure 5:
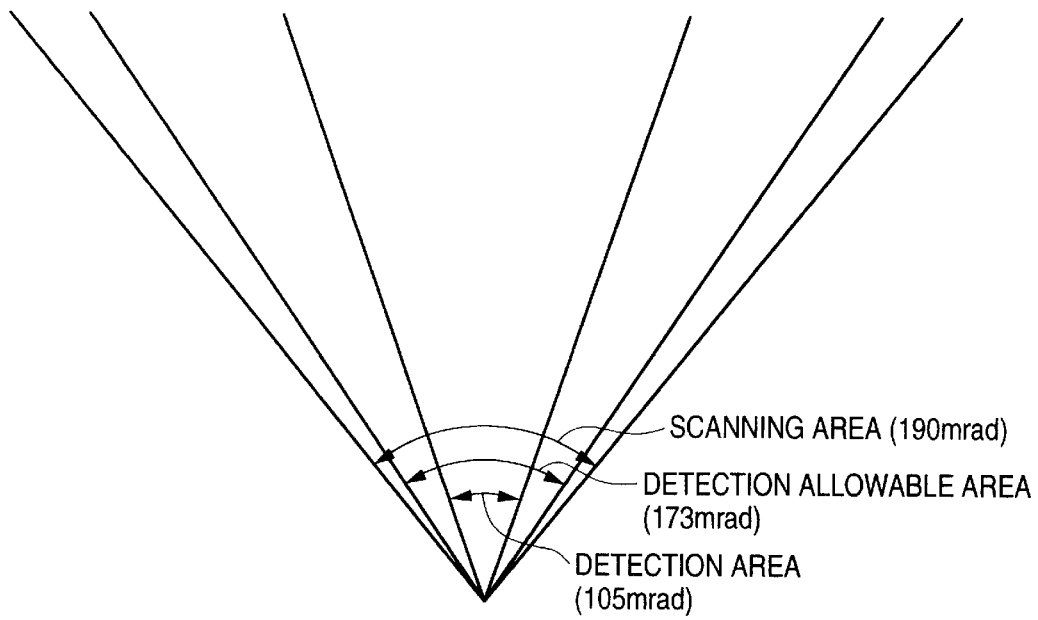
FIG. 5 is a view showing a relation between the scanning area and the detection area of a range finder.

In this example, as shown in FIG. 5, an angle region (scanning area) which is irradiated with laser beams is set to be larger than an angle area (detecting area) which receives reflected laser beams and conducts measurement of the aforementioned distance data and others. When a setting position (inside parameter) for processing data of this detecting area in the scanning area (actually in the allowable detection area) is changed, a position of the detecting area can be somewhat adjusted in the transverse direction without physically changing a position at which the optical head of the apparatus is attached.

Figure 2:
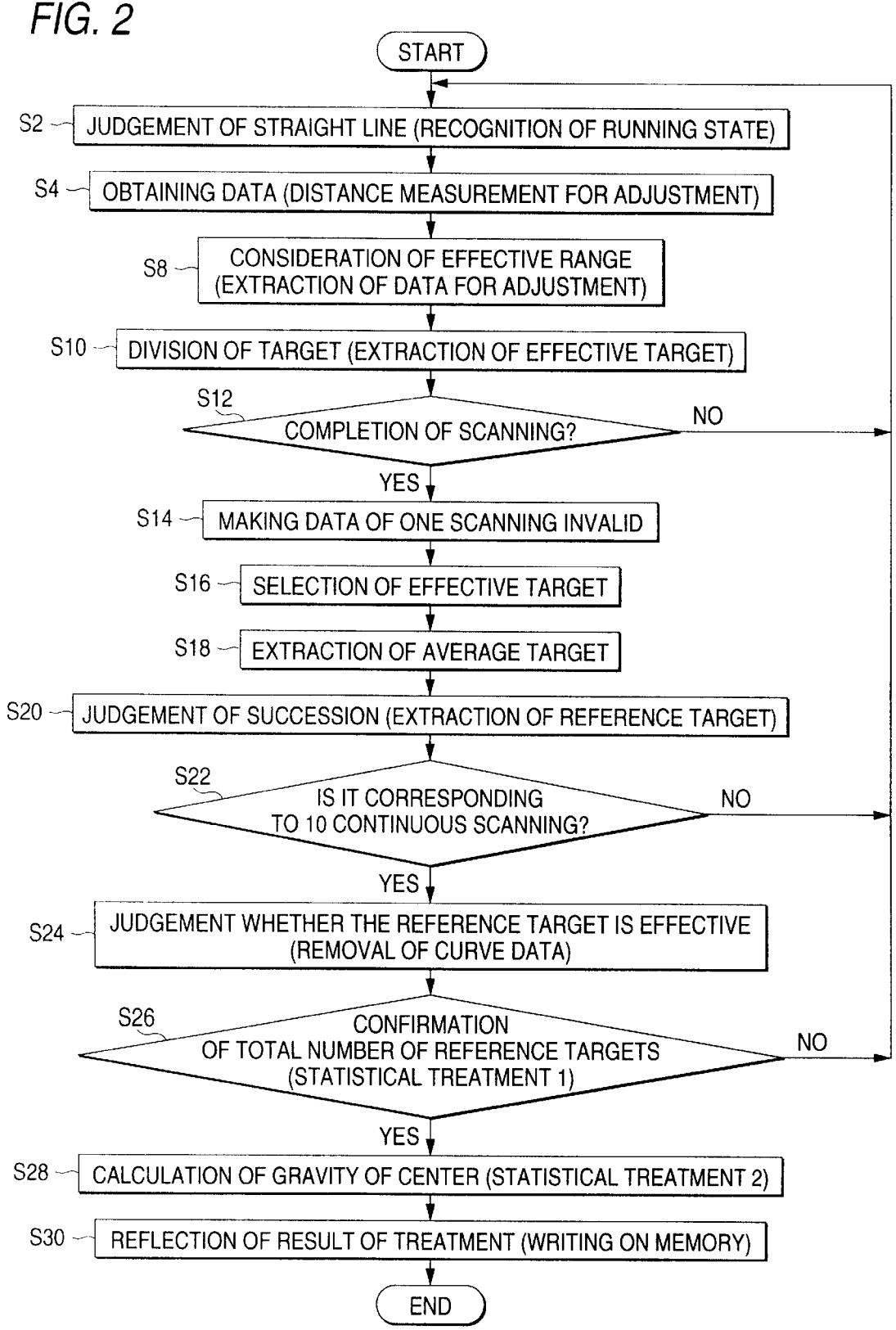
FIG. 2 is a flow chart showing an example of optical axis adjustment processing of a range finder.
Figure 6:
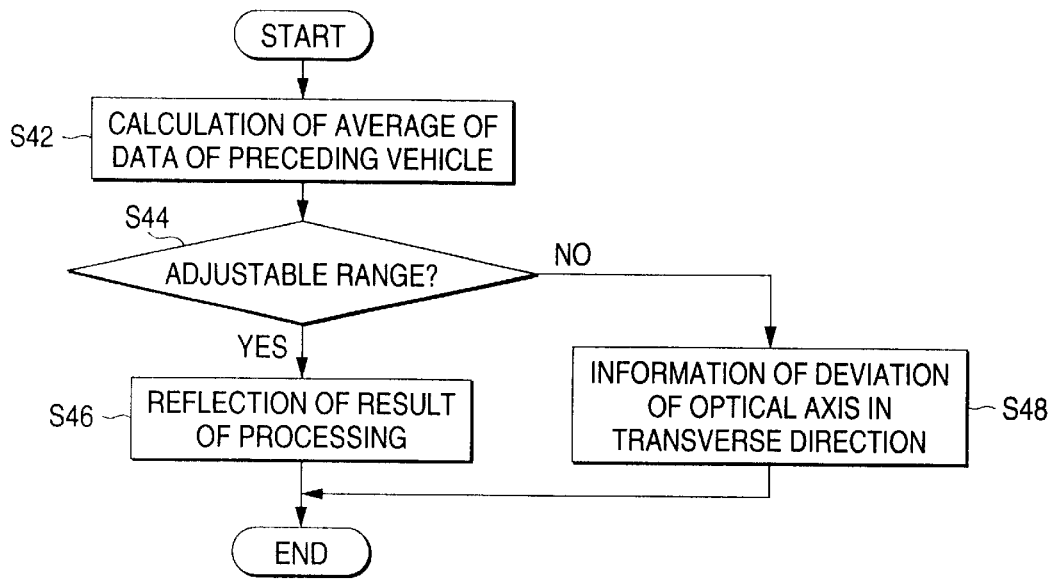
FIG. 6 is a flow chart showing an example of detection processing of optical axis deviation of a range finder.

In this case, the control circuit 7 conducts processing (control for automatically adjusting the optical axis) shown in FIG. 2 and processing (control processing for detecting deviation of the optical axis) shown in FIG. 6. In this way, the control circuit 7 functions as a processing means of the present invention.

Next, operation of the above range finder will be explained as follows. First, operation of the range finder as a laser beam radar in the normal operation will be explained below.

The LD 2 emits the laser beams when it is driven by the LD drive circuit 3 at each light emitting timing made by the control circuit 7. While the laser beams sent from the LD 2 are subjected to scanning by the scanner 1, the scanning area larger than the detecting area is irradiated with these laser beams as shown in FIG. 5.

When the irradiated laser beams are reflected on and returned from the object to be detected, this reflected light is received by PD 5, and the signal of the quantity of received light is inputted into the control circuit 7 via the light reception circuit 6. In the control circuit 7, the aforementioned data (the distance, direction and the quantity of received light) is first generated by the signal of the quantity of received light and the scanning direction signal inputted from the scanning position detecting device 4.

In this connection, the data (the distance, the direction and the quantity of received light) is generated each time light emitting and light receiving are conducted in the detecting area which is smaller than the scanning area shown in FIG. 5. After all, processing for detection of this range finder is conducted only on the object to be detected disposed in the detection area.

In the control circuit 7, according to the above data (the distance, the direction and the quantity of received light) and speed data of the self-vehicle inputted from a vehicle speed sensor not shown in the drawing, the following processing is carried out at a predetermined period (in this case, a period at which the laser beams are subjected to scanning).

The distance from the range finder to the object to be detected and direction data (polar coordinates data) are converted into X and Y coordinates (Cartesian coordinates data) and stored in a memory (not shown) for each region together with the data of the quantity of received light. In this case, each region is defined as a region which is previously set by equally dividing the detecting area.

Data is grouped and the object is extracted on the basis of the distance data stored in the memory which is converted into Cartesian coordinates and registered for each region. At the same time, a distance from the laser beam emitting section to the grouped object in X-direction (for example, in the transverse direction) and Y-direction (for example, in the longitudinal direction) and a width are calculated.

In this case, grouping is defined as processing in which individual data adjacent to each other, the distance of which is small, is collected and made to be one object. Specifically, for example, a window (region on Cartesian coordinates) of a constant width is provided for individual data in the longitudinal and the transverse direction, and other data contained in this window is made to be the same group with each other. In this connection, the thus grouped data, which will be referred to as group data hereinafter, is treated as one unit in the following processing.

The object detected in the last time scanning is made to correspond to the object detected in this time scanning, and further a relative speed of the object to be detected is calculated.

That is, the constant window is set, the center of which is located at a position at which the group data is estimated to appear at this scanning time from the position of group data at the last time scanning and the relative speed. It is judged whether or not the group data of this time are in this window. When the group data of this time is in this window, the group data of the last time and the group data of this time are assumed to be of the same object, and the relative speed is calculated by the moving distance.

Next, an attribute of the detected object is discriminated according to the width and the relative speed of the object.

For example, when the width of the object is compared with a reference value of width which is previously registered, it is discriminated whether the object is a vehicle, a bike, a man, a billboard or a reflector located on the road side. When the relative speed of the object is compared with a speed of the self-vehicle, it is discriminated whether the object stops or moves.

Next, according to the result of the above discrimination, the object such a preceding vehicle is specified which becomes an object of the monitoring system for monitoring an obstacle located ahead and also becomes an object of the running control system for controlling running to follow the preceding vehicle. Information (position data and relative speed data) with respect to the specified preceding vehicle is successively sent to the monitoring system for monitoring the obstacle located ahead and the control means for controlling the running to follow the preceding vehicle, so that operation of these systems can be controlled.

Next, operation of adjusting the optical axis of the above range finder will be explained below. In this connection, the adjustment of the optical axis in this example is conducted while the self-vehicle into which the range finder is incorporated is running.

For example, when a command of adjusting the optical axis is given by an operation switch not shown in the drawing, or when an interruption time comes in a predetermined period, the control circuit 7 carries out controlling shown in the flow chart of FIG. 2.

First, in step S2, an output of the sensor such as the steering angle sensor 8 is read out, and a running condition of the self-vehicle, into which the range finder is incorporated, is judged. After it has been confirmed that the self-vehicle is running straight, the program proceeds to step S4. In this connection, when the self-vehicle is not running straight, data to be used as a base of adjusting the optical axis should not be collected. Therefore, the program does not process to step S4 until the self-vehicle is running straight. In the case where the self-vehicle does not run straight even when a predetermined period of time has passed, it is assumed that the adjustment can not be conducted. Therefore, a series of processing is ended.

Next, the same detection processing as that of the aforementioned normal operation is started in step S4. That is, the aforementioned data (the distance, the direction and the quantity of received light) are generated by emitting and receiving laser beams. The thus obtained data is converted into X and Y coordinates, which are coordinates in the longitudinal and the transverse direction, and stored in a memory (not shown) for each region.

Next, in step S8, invalid data contained in the obtained data is excluded, and only effective data for adjusting the optical axis is extracted. Specifically, for example, data obtained within a short distance of 30(m) from the range finder is unstable because of reflection on the vehicle body, and further it is difficult to discriminate the entire profile of the object. Therefore, data obtained within a short distance of 30 m from the range finder is excluded. Data obtained at a long distance exceeding 50 m is excluded because there is a possibility that the object is a vehicle running in another lane and further the distance resolving power is deteriorated in the transverse direction. When a quantity of received light is smaller than a predetermined value, data is excluded because there is a possibility that the thus obtained data is of a body except for the reflecting body. In this connection, exclusion of data described in this step means that the data is excluded from an object to be processed in the later process, but exclusion of data does not necessarily mean elimination from the memory.

Figure 3:
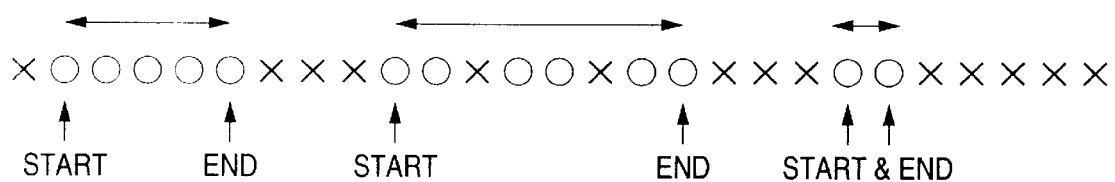
FIG. 3 is a schematic illustration showing an image of division of a target of a range finder.

Next, in step S10, data in each region is divided as shown in FIG. 3 so that data can be grouped. Then, the object to be detected (target) is extracted. Then, a position of the center of the grouped object in the longitudinal direction (it is a distance from the self-vehicle to the center of the object, which will be referred to as a center distance hereinafter), a position of the center of the object in the transverse direction (it will be referred to as a center position hereinafter), and a width of the object to be detected are calculated.

In step S12, it is judged whether or not one scanning (scanning corresponding to one period conducted by the scanner 1) is completed. When it is completed, the program proceeds to step S14. When it is not completed, processing of steps S2 to S10 is repeated at a predetermined sampling period.

Next, in step S14, for example, when the number of the effective objects to be detected, which have been obtained in the processing conducted in steps S4 to S12, is not less than 11, all data corresponding to one scanning is made to be invalid. In this connection, this processing is conducted to restrict the maximum number of the effective targets, for example, to restrict the maximum number at 10 for the reasons of the restriction of the memory capacity. Therefore, when the memory has a sufficiently large capacity, this processing is not necessarily required.

Next, in step S16, the effective target is selected. That is, the following data is excluded from data of the object to be detected which has been obtained in the processing of steps S4 to S12 in one scanning. That is, data starting at the starting position of the detection area, and data continuing to the end position of the detection area are excluded because there is a high possibility that the entire object to be detected can not be detected. In this case, data of the object to be detected, which the width of which is greatly different from the common width of a reflecting body disposed at the rear of the vehicle, may be excluded.

The remaining data is given priority as follows, and data of the two high-ranking object to be detected is extracted. First, an object to be detected which is located at a position close to the self-vehicle is given priority, or an object to be detected, the maximum quantity of received light of which is large, is given priority. In this connection, an object to be detected, which is located at the center in the transverse direction, may be given priority.

In this connection, when the number of pieces of data of the effective objects to be detected, which have been obtained in steps S4 to S12 in one scanning, is not more than 1, processing after step S16 is not carried out, and the program is returned to step S2, and data of one scanning is made to be invalid.

Next, in step S18, for example, when a positional difference between the centers of the two objects to be detected, which have been selected in step S16, is ±0.5 m, the two objects are assumed to be the same object, which will be referred to as an average target. Then, the center position, the center distance and the average of data of the maximum quantity of received light are found, and also the width (the width of the above average target) is found.

In this connection, due to the processing conducted in step S18, when the preceding vehicle is running at an appropriate distance from the self-vehicle, the entire preceding vehicle is extracted as the average target, that is, the entire preceding vehicle is extracted as one object to be detected. In this case, concerning the two objects to be detected, which have been selected in step 16, reflecting bodies disposed on both sides of the preceding vehicle are respectively detected. Therefore, when the reflecting bodies are treated as one body, it is possible to catch the entire preceding vehicle.

Next, in step S20, the average target obtained in step S18 in the scanning of this time and the average target obtained in step S18 in the scanning of the last time are compared with each other. For example, when a difference between their centers is ±0.5 m, the processing is continued. On the other hand, when the above condition is not satisfied, for example, the program is returned to step S2 and the processing is repeated.

In other words, in this case, it is confirmed that positional data of the preceding vehicle in the transverse direction is continuously located in a close range.

In step S22, when judgment conducted in step S20 is continuously established with respect to data corresponding to 10 scanning, an average of data of the average target of 10 scanning is used as a reference target, and the program proceeds to the next step S24. In this connection, when the number of the scanning periods is smaller than the aforementioned predetermined number (in this case, the predetermined number is 10) although the judgment conducted in step S20 is continuously established and the processing is continued, the program is returned to step S2, and data of the next scanning period is collected.

Next, in step S24, data of a curve is removed. When a road on which the preceding vehicle is running changes from a straight line to the curve, although the self-vehicle is running on the straight road, the preceding vehicle is running on a curved road. For example, in the case where the distance between the self-vehicle and the preceding vehicle is 30 m and the running speed is 30 km/h, this state continues for 3.6 seconds. Accordingly, for example, when the scanning period is 0.1 second, it corresponds to 36 scanning, which can not be neglected. For the above reasons, in order to realize a highly reliable optical axis adjustment in a short period of time, it is necessary that data of the reference target collected in the above circumstances is highly reliably discriminated and excluded.

Therefore, in this example, for instance, the following processing is conducted in step S24. Data of the reference target obtained in the processing until step S22 is stored. If the self-vehicle continues to go straight for a predetermined period of time (for example, 5 seconds) after that, the stored data of the reference target is made to be effective. Unless the self-vehicle continues to go straight for the predetermined period of time after that, the stored data of the reference target is made to be invalid, and the program is returned to step S2, and the processing is conducted once again.

Concerning the removal of the curve data, within the capacity of the memory, it is preferable to adopt the following another method. Data of the reference target obtained in the processing conducted until step S22 is stored, and at the same time, the vehicle speed data of the self-vehicle at the time of collecting this data is also stored. A time at which the self-vehicle reaches a position (position of the preceding vehicle) of the reference target obtained when the self-vehicle collected the data is found by the vehicle speed stored in the memory. If the self-vehicle is running straight at the time, the reference target, which is stored in the memory, is adopted because it is effective (because it is not the curve data).

Next, in step S26, data at the center of the reference target corresponding to 10 scanning obtained in the processing until step S24 as effective data is successively integrated. Then, it is judged whether or not data is integrated for a predetermined period of time in which data at the center position has been set. That is, it is judged whether or not the data collecting time consumed for collecting integrated effective data has reached the predetermined period of time. If integration of data is conducted for the predetermined period of time, the program proceeds to step S28. Unless integration of data is conducted for the predetermined period of time, the program is returned to step S2 and the processing is repeated.

In this example, a setting value of the integrated time to integrate data in step S26, that is, a data collecting time can be automatically changed over by another program omitted in the drawing. That is, when the-aforementioned mode designation switch 9 is set at the common mode, the setting value is automatically set at a long period of time (for example, about one hour) in which it is estimated that the optical axis adjustment is conducted when the common user is driving the vehicle. When the mode designation switch is set at the short time mode, the setting value is set at a short period of time (for example, about five minutes) in which it is estimated that the optical axis adjustment is conducted when a technical worker is driving the vehicle so as to conduct the optical axis adjustment.

Figure 4:
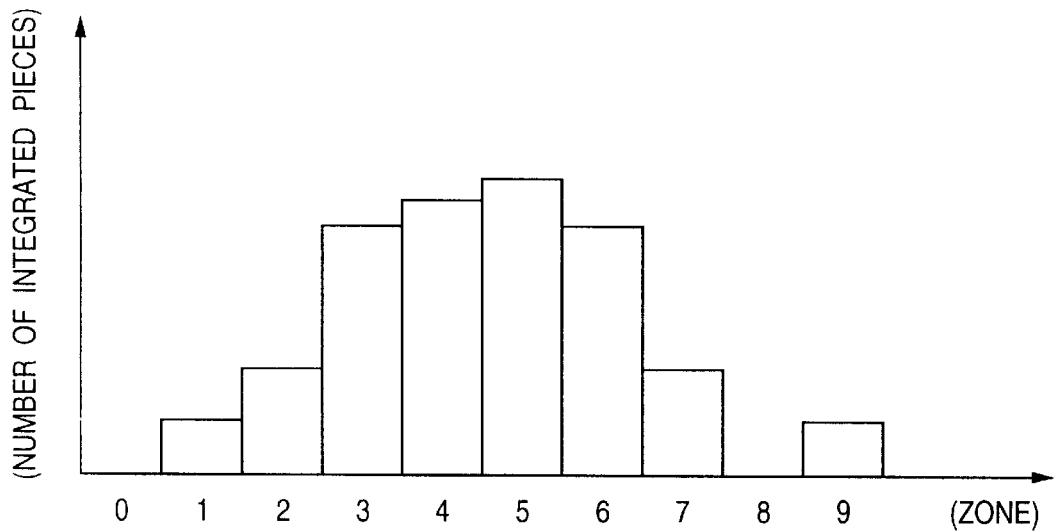
FIG. 4 is a graph showing a statistical treatment of detection data of a range finder.

In this case, integration of data at the center of the reference target is conducted as shown in FIG. 4. That is, a coordinate in the transverse direction is divided into, for example, ten zones (regions), and the number of pieces of data is integrated for each zone to which the data belongs. That is, frequency distribution, which expresses the number of pieces of data which belongs to each zone, is calculated.

In step S28, zones in which frequency is low, for example, zones 1, 2, 7 and 9 in FIG. 4 are excluded, and only the residual zones, for example, zones 3 to 6 in FIG. 4 are determined to be objective zones, and a position of the center of gravity of the frequency distribution graph is found. This position of the center of gravity is determined to be the most appropriate center position (the appropriate position) of the detection area. In other words, a difference between the position of the center of gravity and the center position of the present detection area is determined to be an aiming angle (an amount of angle to be adjusted).

In this connection, the position of the center of gravity corresponds to the average center position of the preceding vehicle in the present invention.

In order to avoid the occurrence of problems such as oscillation caused when the detection area is sharply changed, it is preferable that a predetermined restriction is set on the aiming angle.

Integration of data at the center of the reference target is conducted in such a manner that data is simply added (accumulated). In step S28, the result of accumulation is divided by the number of pieces of data, so that a simple average is calculated, and this simple average may be an appropriate position (average center position of the preceding vehicle) of the detection area. However, according to the aforementioned method in which the frequency distribution is used to find the appropriate position, it is advantageous that the calculation becomes easy and the capacity-of the memory required for the calculation can be reduced. Further, it is advantageous that the most appropriate center position can be more accurately found because zones of low frequency are excluded from the object of the calculation.

Next, in step S30, the inside parameter is changed so that the detection area can be changed by the above aiming angle. For example, as shown in FIG. 5, data to determine the position of the detection area in the detection allowable area is changed only by the aiming angle, and the memory is renewed and registered.

In this connection, a driver may be informed of the following previously or after the fact by a display means not shown in the drawing. In step S30, or before and after step S30, the detection area deviated by the above aiming angle; correction is conducted corresponding to the above aiming angle; or correction was conducted corresponding to the above aiming angle.

According to a series of processing described above, processing of steps S2 to S12 is repeatedly conducted at a predetermined sampling period, and only when the self-vehicle is in a condition of running straight, all reflecting objects located in the present detection area are detected as objects to be detected. Each time one scanning is completed, that is, at a predetermined scanning period, processing in steps S14 to S22 is carried out with respect to data of the object to be detected which has been collected at the latest scanning period. Data having a very high possibility that the data is of a preceding vehicle, that is, data of the aforementioned reference target is selected. Further, only when the data is in a predetermined close distance while ten scanning is continuously conducted, it is adopted as effective data of the reference target.

According to the processing conducted in steps S24 and S26, data in which the self-vehicle is running on a straight road, however, the preceding vehicle is running on a curved road, that is, the aforementioned curve data is excluded, and data of the reference target is integrated. In step S28, according to the result of this integration, the average center position (in this case, the position of the gravity center) of data of the reference target adopted as effective data, which has been collected in a predetermined period of time by a predetermined large number, is found. Further, in step S30, the inside parameter is changed so that the center position of the detection area can coincide with this center position.

Due to the foregoing, when the range finder of this example is used, even in the case of the common user or the technical worker, only when the function of the above processing means is activated while the self-vehicle is running in chase of the preceding vehicle, the axis adjustment can be automatically conducted by the processing means. Therefore, the range finder of this example is very convenient.

According to the range finder of the present invention, even when the common user drives the vehicle, the axis adjustment can be accurately conducted in a relatively short period of time. In this device, only detection data of the preceding vehicle collected in a state of running straight, in which both the self-vehicle and the preceding vehicle are running straight on the same straight road so that the adjustment can be suitably conducted, is successively extracted as data to determine a reference position of adjusting the axis (the most appropriate position of the center of the detection area). Therefore, even when a quantity of available data is small, it is possible to conduct adjustment of the axis with accuracy.

For example, even in the case where the vehicle runs on the straight road at times, that is, even in the case where the vehicle runs on a road in which straight portions and curved portions appear alternately, effective data is collected each time, and when the quantity of collected data has reached a predetermined value, the axis adjustment is completed. From this viewpoint, the axis adjustment can be easily completed in a short period of time.

For example, in the case of a structure in which it is required as a condition of adjustment that the vehicle is running straight in all periods until a plurality of pieces of necessary data are collected, in order to enhance the accuracy, it is necessary for the self-vehicle and the preceding vehicle to run straight on a very long straight road. Unless the road on which the vehicles are running is 5o long and straight, the adjustment can not be completed.

Therefore, it is very difficult to conduct adjustment and further it takes long time to carry out the adjustment.

In this example, it is possible to accurately discriminate a state in which the preceding vehicle is stably running on the same straight road as that of the self-vehicle, and the appropriate position at which the center of the detection area must be located is determined only by the data collected in the above state.

In this case, first, data is collected on the assumption that the self-vehicle is running straight. The center of the reference target extracted from the preceding vehicle that is running at an appropriate distance is made to be effective only when it continues for ten scanning in a close range in the transverse direction. Further, the aforementioned curve data is eliminated. Due to the foregoing, only data obtained in a state in which the self-vehicle is running straight and the preceding vehicle is stably running on the same straight road as that of the self-vehicle is made effective. Due to the foregoing, even when the number of pieces of data is small, that is, even when the data collecting time is short, it is possible to adjust the optical axis with higher accuracy, and the adjusting time can be further reduced.

For example, when the following optical axis adjusting method is carried out in which the range finder of the present example is used, it is possible to conduct a highly accurate optical axis adjustment in a very short period of time. A worker is previously informed of a state which is suitable for adjusting the optical axis, and the worker drives the self-vehicle. Preferably, another worker drives the preceding vehicle, and both workers positively cooperate with each other so as to make a state suitable for adjusting the optical axis. In the above state, the optical axis adjustment is carried out more accurately.

In this case, the state which is suitable for adjusting the optical axis is described as follows. A distance between the self-vehicle and the preceding vehicle is in a range from 30 m to 50 m as described before; a profile of the road on which the self-vehicle and the preceding vehicle are running is a completely straight road; a reflecting body of the preceding vehicle is not stained; reflecting bodies are seldom located except for the reflecting body attached to the preceding vehicle; the preceding vehicle is stably running at the center of the lane; and the self-vehicle is also stably running at center of the lane. When the adjustment motion is carried out while the above state is positively made, it is possible to conduct a highly accurate adjustment even if a quantity of integrated data is extremely reduced in step S26.

In this range finder, it is estimated that the optical axis adjustment is conducted by the technical worker in a short period of time, and the integration time (data collecting time) in step S26 is automatically changed by the operation of the mode designation switch 9. Therefore, when the range finder of this example is put into practical use, it is advantageous in that the optical axis adjustment can be instantly conducted in a very short period of time when the technical worker operates this switch 9. Unless the aforementioned mode changing function is provided, the integration time must be fixed at a long period of time suitable for conducting the automatic optical axis adjustment while the common user is driving the vehicle. Accordingly, it is impossible to reduce the adjustment time even if the state suitable for adjustment is made. In order to reduce the adjustment time regardless of the difficulty, it becomes necessary to conduct such a complicated adjustment work that the data of the integrated time registered in the memory is changed in the work only when the technical worker conducts the optical axis adjustment.

Accordingly, when the range finder and the optical axis adjustment method of this example are adopted, the following advantages can be provided. When the technical worker conducts the optical axis adjustment at the time of shipment or maintenance of the range finder, it is possible to adjust the optical axis in a very short period of time. Further, when the common user uses the range finder, the highly accurate optical axis adjustment can be automatically conducted in a certain period of time without the recognition of the common user. Accordingly, while the common driver is driving the vehicle, it is possible to automatically adjust the deviation of the optical axis caused by uneven abrasion of a tire when the vehicle is driven over a long period of time and also caused by looseness of an attaching screw. Also, it is possible to automatically adjust a deviation of the optical axis caused by a light collision of the vehicle which requires no repair.

Next, a motion for detecting a deviation of the optical axis in the transverse direction of the above range finder will be explained below. In this connection, detection of the deviation of the optical axis of this example is conducted while the self-vehicle is running.

For example, when a command of detecting the deviation of the optical axis is given by an operation switch not shown in the drawing, or for example, by the interruption time at a predetermined period, the control circuit 7 carries out the control processing shown in the flow chart of FIG. 6.

First, in step S42, for example, the same processing as that of steps S2 to S28 shown in FIG. 2 is carried out, so that an average of the center of the preceding vehicle (for example, a value of the center of gravity described before) is found, and also a difference between this value and the center of the present detection area, that is, the aforementioned aiming angle is found.

Next, in step S44, it is judged whether or not a setting of the aiming angle found in step S42 can be changed by changing the inside parameter. That is, it is judged whether or not the overall detection area after a change is accommodated in the detection allowable area, which is exemplarily shown in FIG. 5, when a position of the present detection area is changed by the above aiming angle. When it is accommodated in the detection allowable area so that it can be adjusted, the program proceeds to step S46, and when it is not accommodated in the detection allowable area so that it can not be adjusted, the program proceeds to step S48.

In step S46, processing may be conducted so that a driver or a worker can be informed of the possibility of adjustment. Alternatively, the same processing as that of step S30 shown in FIG. 2 may be conducted, so that the inside parameter can be automatically changed and the detection area can be changed to the appropriate position.

On the other hand, in step S48, processing is conducted so that the driver or the worker can be informed of the occurrence of a large deviation of the optical axis, that is, the driver or the worker can be informed that the adjustment can not be performed by changing the inside parameter. In this case, operation of the chasing running system, in which the result of detection of the laser radar is used, may be forcibly stopped, or alternatively the processing to stop the operation may be conducted.

According to the above processing, when a large deviation of the position of the detecting area in the transverse direction is caused by a light collision, the driver is informed of the automatically detected deviation of the position. Therefore, it is possible to avoid that the vehicle or its chasing running system continues to run under the condition that the optical axis deviates greatly.

In this connection, the above detection of deviation of the optical axis can be also realized by a program integrated with the above adjustment of the optical axis. For example, in the flow chart shown in FIG. 2, the processing of steps S44 to S48 may be conducted after step S28.

Next, another embodiment of the optical axis deviation detecting method for detecting a deviation of the optical axis in the transverse direction of the above range finder will be explained below. In this connection, detection of the deviation of the optical axis of this example is conducted while the self-vehicle is running.

In this method, the occurrence of deviation of the optical axis in the transverse direction is judged as follows. Under the condition that it is judged that the vehicle is running straight on a straight road, or under the condition that the vehicle is positively set at the above state, a normal detecting motion is conducted, and a quantity of movement of the object detected as a reflecting body disposed on the road side is analyzed for a predetermined period of time. When a quantity of movement per unit time exceeds a predetermined setting value, it is judged that the deviation of the optical axis in the transverse direction has occurred.

Figure 7A:
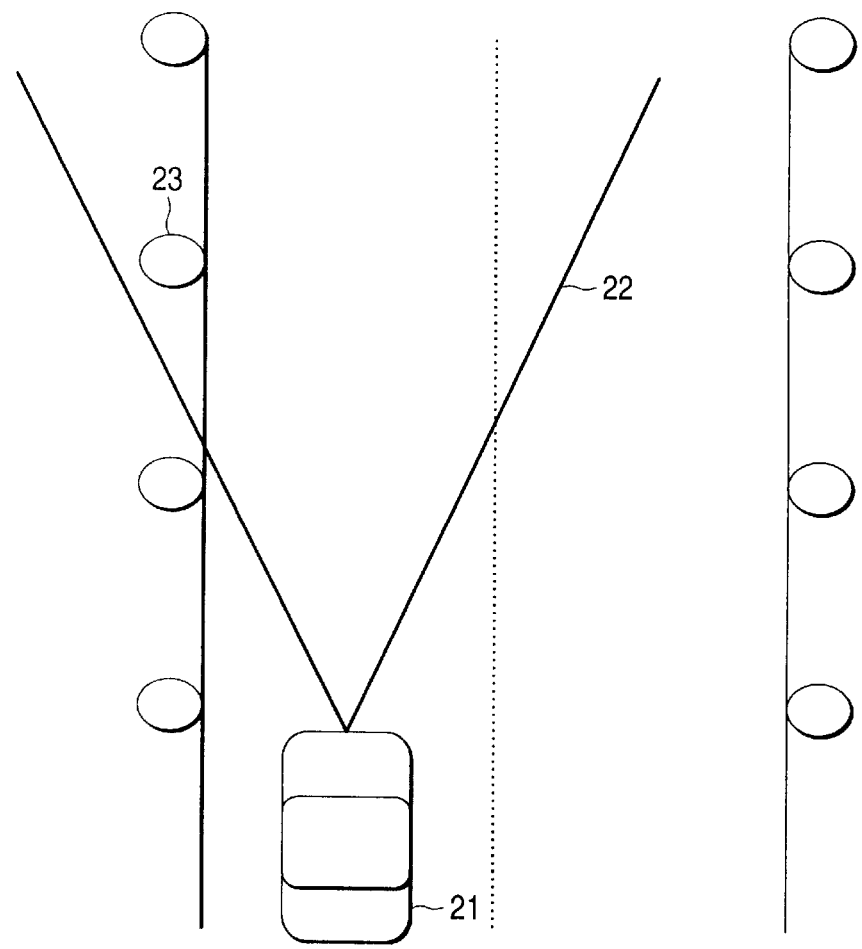
FIGS. 7A and 7B are views for explaining another embodiment of detection processing of optical axis deviation of a range finder.
Figure 7B:
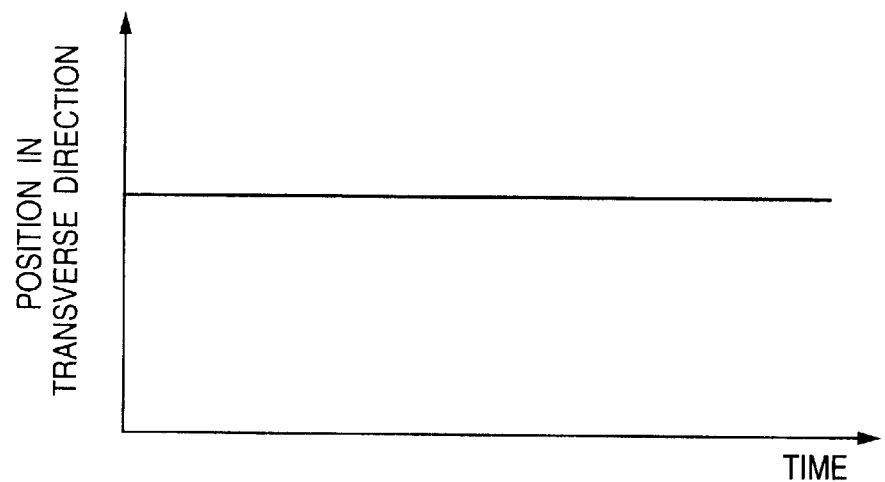

As shown in FIG. 7A, when the detection area 22 is located at an appropriate position or the detection area 22 is located at a position close to the appropriate position under the condition that the self-vehicle 21 is running straight on a straight road, a position of the reflecting body 23 disposed on the road side is substantially constant as shown in FIG. 7B.

Figure 8A:
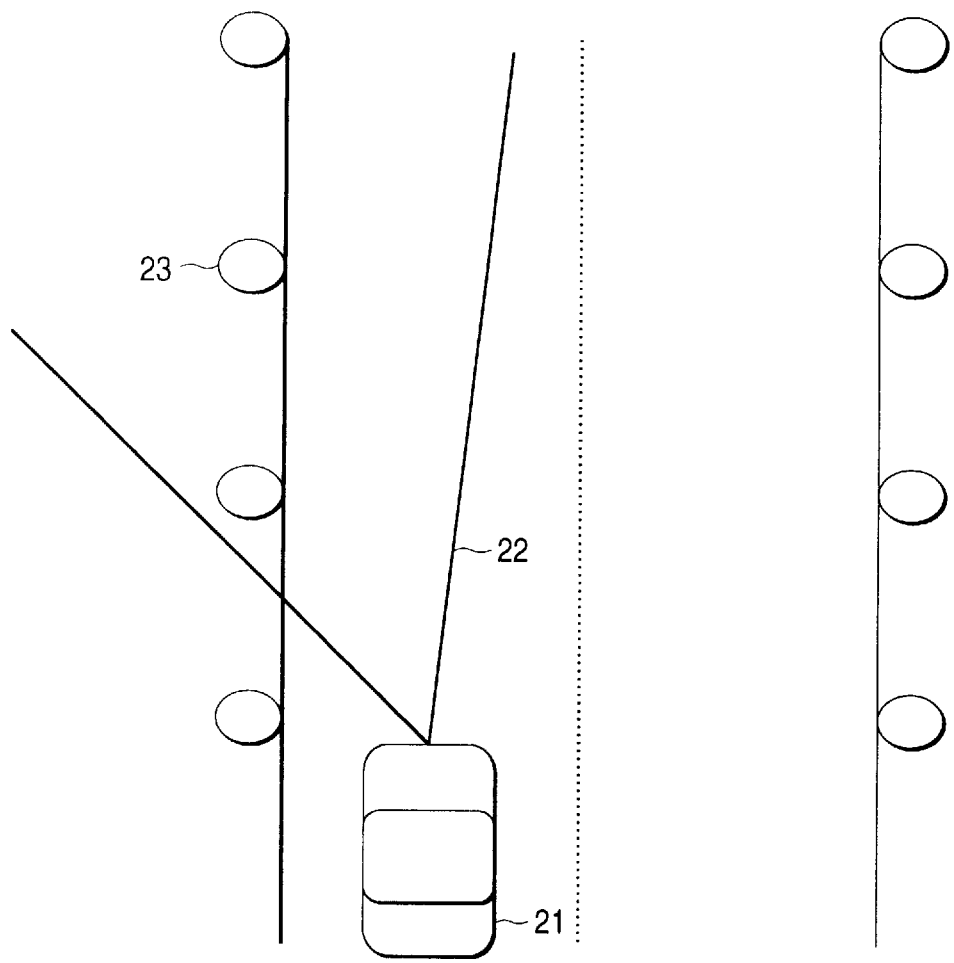
FIGS. 8A and 8B are views for explaining another embodiment of detection processing of optical axis deviation of a range finder.
Figure 8B:
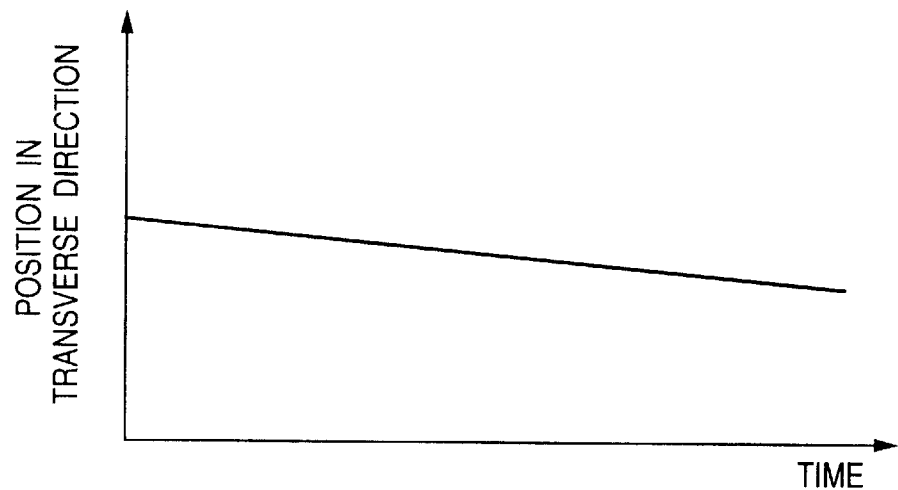

On the other hand, as shown in FIG. 8A, when the detection area 22 deviates from the appropriate position under the condition that the self-vehicle 21 is running straight, a position in the transverse direction of the reflecting body 23 disposed on the road side changes as shown in FIG. 8B.

Therefore, when the aforementioned setting value is set in accordance with a quantity of deviation to be detected, it is possible to detect a deviation of the position of the detection area in the transverse direction.

Therefore, it is possible to avoid that the vehicle or its chasing running system continues to run under the condition that the optical axis deviates in the transverse direction greatly.

In this connection, this optical axis detecting method can be automatically carried out by the processing conducted by a microcomputer, for example, the control circuit 7. Even when the above method is adopted, it is possible to compose the device in such a manner that a driver is informed of the occurrence of optical axis deviation or that the chasing running system is stopped when optical axis deviation has been detected.

Next, a method of detecting deviation of the optical axis in the vertical direction of the above range finder will be explained below. In this connection, detection of the optical axis of this example is effective even when the vehicle stops or is running.

In this method, when a normal detecting motion is conducted and the object to be detected can not be continuously detected for a period of time exceeding a setting time, it is judged that the center of the detection area deviates from the appropriate position in the vertical direction.

For example, when the detection area greatly deviates from the appropriate position in the upward direction, any object can not be detected because no reflecting body usually exists in such a direction. When the detection area greatly deviates from the appropriate position in the downward direction, only a road surface located at a short distance is detected. Since such a road surface is located at an excessively short distance, or since the data continues to an end of the detection area, the data is not usually adopted as effective detection data. Due to the foregoing, no effective object can be detected. Consequently, when the above non-detecting condition continues for a certain period of time, it is sure that the detection area deviates in the vertical direction. Accordingly, the optical axis deviation in the vertical direction can be detected with high accuracy.

Therefore, according to the above method, it is possible to avoid a state in which the vehicle is running or its chasing running system is being continuously operated under the condition that the optical axis deviates in the vertical direction.

In this connection, this optical axis detecting method can be automatically carried out by the processing conducted by a microcomputer, for example, the control circuit 7. Even when the above method is adopted, it is possible to compose the device in such a manner that the driver is informed of the occurrence of optical axis deviation or that the chasing running system is stopped when optical axis deviation has been detected.

In this connection, the present invention is not limited to the above specific example, but various embodiments and variations may be made by a person skilled in the art. For example, in the case where effective data of the preceding vehicle (reference target) can not be extracted, for example, when the program does not proceed to step S28 even after a predetermined period of time has passed in the flow chart shown in FIG. 2, the worker may be informed that no extraction can be conducted, by means of display.

Detection of deviation of the axis of the present invention may be conducted periodically, and adjustment of the optical axis of the present invention may be conducted only when deviation of the optical axis is detected by the above detection of deviation of the optical axis.

Of course, the present invention can be applied to not only a range finder in which laser beams are used but also a range finder in which electric waves or acoustic waves are used.

In a first aspect of the present invention, a self-vehicle into which the range finder is incorporated is made to follow a preceding vehicle which is running straight on the same straight line, a plurality of pieces of detection data of the preceding vehicle are obtained by the range finder, the appropriate position is judged as an average center of the preceding vehicle obtained by statistically treating the plurality of pieces of detection data of the preceding vehicle, and a parameter of the detection area of the range finder is changed so that a center of the detection area can coincide with the appropriate position.

According to the present invention, a state in which the preceding vehicle is running straight at a position on the same straight line as that of the self-vehicle is positively made, and a plurality of pieces of detection data of the preceding vehicle are collected in the above state. Therefore, the average center of the preceding vehicle which is judged as an appropriate position to be used as a reference of optical axis adjustment coincides with an ideal position (center in front of the self-vehicle in the running direction). Therefore, it is possible to conduct a highly accurate optical axis adjustment in a short period of time.

In this connection, the method of the present invention is most appropriate for the optical axis adjustment work conducted by a technical worker at the time of shipment or maintenance. It is very easy to let the technical worker know that it is necessary to make the above state for adjusting the optical axis. Further, when the working time of the technical worker is reduced, it is possible to reduce a cost of manufacture or maintenance, which is practically advantageous.

In this connection, when the above technical worker carries out the adjustment work of the present invention, when other circumstances are improved, for example, when the reflecting body of the preceding vehicle is not stained or when the number of reflecting bodies except for the reflecting body attached to the preceding vehicle is small, the working time can be further reduced.

In a second aspect of the present invention, a self-vehicle into which the range finder is incorporated is made to follow a preceding vehicle which is running straight on the same straight line, a plurality of pieces of detection data of the preceding vehicle are obtained by the range finder, the appropriate position is judged as an average center of the preceding vehicle obtained by statistically treating the plurality of pieces of detection data of the preceding vehicle, and deviation from the appropriate position in the detection area is detected when the appropriate position and the center of the detection area are compared with each other.

In the present invention, a state in which the preceding vehicle is running straight in front of the self-vehicle on the same straight line is positively made, and a plurality of pieces of detection data of the preceding vehicle are collected. Therefore, an average center of the preceding vehicle to be judged as the appropriate position used as a reference of adjusting the axis accurately coincides with an ideal position (center in front of the self-vehicle in the running direction) even when a quantity of detection data, which has been collected, is small.

Accordingly, it becomes possible to detect deviation of the optical axis with high accuracy. When the above detection of detecting deviation of the optical axis is conducted periodically, it is possible to avoid the occurrence of a state in which the vehicle and its chase running system are operated under the condition that the detection area deviates from the appropriate position. In this connection, the method of the present invention is most appropriate when the detection work for detecting deviation of the optical axis is conducted by a technical worker at the time of shipment or maintenance of a vehicle. When the work is conducted in an improved state described above, the working time can be further shortened.

In a third aspect of the present invention, a vehicle into which the range finder is incorporated is made to run on a straight road, on the side of which a reflecting body is disposed, a change with time of detection data of the reflecting body disposed on the side of a road obtained by the range finder is observed for a predetermined period of time, and the detection area is judged that it deviates from the appropriate position in the transverse direction when a quantity of movement of the reflecting body in the transverse direction exceeds a setting value in the observation.

When the detection area is located at the appropriate position under the condition that the self-vehicle is running straight on a straight road, the reflecting body disposed on the road side is located at a substantially constant position in the transverse direction. On the other hand, when the detection area deviates from the appropriate position under the condition that the self-vehicle is running straight on a straight road, a position of the reflecting body disposed on the road side changes in accordance with a quantity of deviation of the detection area from the appropriate position.

Therefore, when the setting value is set in accordance with a quantity of deviation to be detected, it is possible to detect a positional deviation of the detection area in the transverse direction.

Consequently, when this method is adopted, it is possible to avoid the occurrence of a state in which the vehicle and its chase running system are operated under the condition that the detection area deviates from the appropriate position in the transverse direction.

In a fourth aspect of the present invention, it is judged that the center of the detecting area deviates from the appropriate position in the vertical direction when an object to be detected can not be continuously detected in a period of time exceeding a predetermined period of time.

For example, when the detection area greatly deviates from the appropriate position in the upward direction, any object can not be detected because no reflecting body usually exists in such a direction. When the detection area greatly deviates from the appropriate position in the downward direction, only a road surface located at a short distance is detected. Since such a road surface is located at an excessively short distance, or since the data continues to an end of the detection area, the data is not usually adopted as effective detection data. Due to the foregoing, no effective object can be detected. Consequently, when the above non-detecting condition continues for a certain period of time, it is sure that the detection area deviates in the vertical direction. Accordingly, the optical axis deviation in the vertical direction can be detected with high accuracy.

Therefore, according to the above method, it is possible to avoid a state in which the vehicle is running or its chasing running system is being continuously operated under the condition that the optical axis deviates in the vertical direction.

In a fifth aspect of a present invention, A range finder comprises a processing means such as a micro-computer characterized in that only a plurality of pieces of detection data of a preceding vehicle, which have been collected when a self-vehicle into which the range finder is incorporated and a preceding vehicle running in the front of the vehicle are running straight on the same straight line, are extracted as effective data for a predetermined period of time; and setting of a parameter of the detecting area is changed so that a center of the detecting area can coincide with an average center of the preceding vehicle obtained when the plurality of effective extracted data are statistically treated.

Due to the above arrangement, even when the common user or a technical worker activates the function of the processing means while the self-vehicle is made to run and chase the preceding vehicle, the optical axis of the range finder can be automatically adjusted by the processing means.

Further, according to the range finder of the present invention, even when the common user drives the vehicle, it is possible to conduct a highly accurate optical axis adjustment in a relatively short period of time. In the range finder of the present invention, only the data of the preceding vehicle, which has been collected in a state appropriate for adjustment (a state of running on a straight road) in which the preceding vehicle is running on the same straight road as that of the self-vehicle, is successively extracted and used as data to determined the reference position (the most appropriate position of the center of the detection area) for adjusting the optical axis of the range finder.

Due to the above arrangement, even when a quantity of data is small, it is possible to conduct an accurate adjustment.

For example, even in the case where the vehicle runs on a straight road at times, that is, even in the case where the vehicle runs on a road in which straight portions and curved portions appear alternately, effective data is collected each time, and when a quantity of collected data has reached a predetermined value, the axis adjustment is completed. From this viewpoint, the axis adjustment can be easily completed in a short period of time.

In a sixth aspect of the present invention, a range finder comprises a processing means such as a micro-computer characterized in that only a plurality of pieces of detection data of a preceding vehicle, which have been collected when a self-vehicle into which the range finder is incorporated and a preceding vehicle running in front of the self-vehicle are running straight on the same straight line, are extracted as effective data for a predetermined period of time; and deviation of the detecting area from an appropriate position is detected when an average center of the preceding vehicle obtained when the plurality of effective extracted data are statistically treated are compared with a center of the detecting area.

Due to the above arrangement, deviation of the optical axis is automatically detected when processing is conducted by the processing means, which is very convenient. Further, it becomes possible to detect deviation of the optical axis in a short period of time with high accuracy.

In a seventh aspect of the present invention, when the mode changeover means is operated, a period of time for collecting the effective detection data can be changed over at least between a long and a short period of time.

Due to the above arrangement, the following advantages can be provided. Two periods of time for collecting the effective detection data are set. One is a period of time preferable for the common user to use the range finder, and the other is a period of time preferable for a technical worker to conduct an adjustment of the optical axis or a detection of deviation of the optical axis. When the two types of periods of time are set as described above, in the case of a technical worker, it is possible for him to complete the adjustment in a minimum working time suitable for adjustment, and in the case of the common user, it is possible to maintain a high accuracy of adjustment when he conducts adjustment of the optical axis and detection of the deviation of the optical axis while consuming a relatively long period of time.

In an eighth aspect of the present invention, the processing means judges that the self-vehicle and the preceding vehicle are running straight on the same straight line under the condition that a running direction of the self-vehicle detected by a sensor such as a steering angle sensor or a yaw rate sensor at the time of collecting detection data is straight and also under the condition that a running direction of the self-vehicle detected by the steering angle sensor or the yaw rate sensor after a predetermined time has passed from the time of collecting detection data is straight, and detection data of the preceding vehicle not satisfying the above conditions is excluded as unavailable data.

Due to the foregoing, detection data collected in a state in which only the preceding vehicle is running on a curved road although the self-vehicle is running straight is eliminated with high reliability. Therefore, a state in which the vehicles are running straight can be discriminated with higher accuracy, and it becomes possible to accurately conduct the optical axis adjustment with a small number of pieces of data. Therefore, the adjustment time can be further reduced.

In a ninth aspect of the present invention, the processing means judges that the self-vehicle and the preceding vehicle are running straight on the same straight line under the condition that a running direction of the self-vehicle detected by a sensor such as a steering angle sensor or a yaw rate sensor at the time of collecting detection data is straight and also under the condition that a running direction of the self-vehicle detected by the sensor is straight when the self-vehicle has reached a position at which the preceding vehicle was estimated to be located at the time of collecting detection data, and detection data of the preceding vehicle not satisfying the above conditions is excluded as unavailable data.

Due to the above arrangement, detection data collected in a state in which only the preceding vehicle is running on a curved road although the self-vehicle is running straight is eliminated with high reliability. Therefore, the adjustment time can be further reduced.

In a tenth aspect of the present invention, the processing means judges that the self-vehicle and the preceding vehicle are running straight on the same straight line under the condition that a running direction of the self-vehicle detected by a sensor such as a steering angle sensor or a yaw rate sensor at the time of collecting detection data is straight and also under the condition that a position of the preceding vehicle in the transverse direction is continuously detected at one of the positions close to each other for a predetermined setting time, and detection data of the preceding vehicle not satisfying the above conditions is excluded as unavailable data.

Due to the above arrangement, detection data collected in a state in which only the preceding vehicle is running on a curved road although the self-vehicle is running straight is eliminated with high reliability. Therefore, the adjustment time can be further reduced.

In an eleventh aspect of the present invention, when the self-vehicle into which the range finder is incorporated is running, the processing means observes a change with time of detection data of a reflecting body disposed on the road side for a predetermined period of time, and when a quantity of movement of the reflecting body in the transverse direction exceeds a predetermined value in this observation, it is judged that the detection area deviates from the appropriate position.

In this range finder, detection of deviation of the optical axis, the principle of which is the same as that of claim 3, can be automatically carried out by the processing means. Consequently, when this range finder is adopted, it is possible to avoid the occurrence of a state in which the vehicle and its chase running system are operated under the condition that the detection area deviates from the appropriate position in the transverse direction.

In a twelfth aspect of the present invention, when the processing means can not continuously detect an object to be detected exceeding a setting period of time, it is judged that a center of the detection area deviates from the appropriate position in the vertical direction.

In this range finder, detection of deviation of the optical axis, the principle of which is the same as that of claim 4, can be automatically carried out by the processing means. Consequently, when this range finder is adopted, it is possible to avoid the occurrence of a state in which the vehicle and its chase running system are operated under the condition that the detection area deviates from the appropriate position in the transverse direction.

What is claimed is:

1. A method of adjusting a center of a detection area detected by a range finder at an appropriate position for adjusting an axis of said range finder incorporated into a vehicle in which waves are irradiated on a predetermined detection area in front of said vehicle in a scanning manner and detection data including at least positional information on an object to be detected which is located in said detection area is judged and outputted according to said waves reflected on said object to be detected, said method comprising the steps of:

obtaining plural pieces of detection data of said preceding vehicle by said range finder, when said vehicle is running straight on a straight line following a preceding vehicle which is running on the same straight line;

processing said plural pieces of detection data of said preceding vehicle statistically;

judging said appropriate position as an average center of said preceding vehicle; and changing a parameter of said detection area of said range finder so that said center of said detection area coincides with said appropriate position.

2. A method of detecting deviation of an axis of a range finder from an appropriate position, said range finder incorporated into a vehicle in which waves are irradiated on a predetermined detection area in front of said vehicle in a scanning manner and detection data including at least positional information on an object to be detected which is located in said detection area is judged and outputted according to said waves reflected on said object to be detected, said method comprising the steps of:

obtaining plural pieces of detection data of said preceding vehicle by said range finder, when said vehicle is running straight on a straight line following a preceding vehicle which is running on the same straight line;

processing said plural pieces of detection data of said preceding vehicle statistically;

judging said appropriate position as an average center of said preceding vehicle; and detecting deviation from said appropriate position in said detection area when said appropriate position and said center of said detection area are compared with each other.

3. A method of detecting deviation of an axis of a range finder from an appropriate position, said range finder incorporated into a vehicle in which waves are irradiated on a predetermined detection area in front of said vehicle in a scanning manner and detection data including at least positional information on an object to be detected which is located in said detection area is judged and outputted according to said waves reflected on said object to be detected, said method comprising the steps of:

observing time variation of said detection data of a reflecting body disposed on both the road sides by said range finder for a predetermined period of time, while said vehicle is running on the straight line;

judging said detection area to deviate from said appropriate position in the transverse direction when a quantity of movement of said reflecting body in the transverse direction exceeds a setting value in the observation.

4. A method as claimed in claim 2, said method further comprising the steps of:

judging a center of said detection area to deviate from said appropriate position in the vertical direction when said object to be detected is not continuously detected in a period of time exceeding a predetermined period of time.

5. A method as claimed in claim 3, said method further comprising the steps of:

judging a center of said detection area to deviate from said appropriate position in the vertical direction when said object to be detected is not continuously detected in a period of time exceeding a predetermined period of time.

6. A range finder incorporated into a vehicle in which waves are irradiated on a predetermined detection area in front of said vehicle in a scanning manner and detection data including at least positional information on an object to be detected which is located in said detection area is judged and outputted according to said waves reflected on said object to be detected, said range finder comprising:

extraction means for extracting only plural pieces of detection data concerning a preceding vehicle, which have been obtained when said vehicle runs on the same straight line as that on which said preceding vehicle runs, as effective data for a predetermined period of time;

processing means for processing said plural pieces of extracted effective data statistically; and change means for changing setting of a parameter of said detection area according to a result of said processing means, so that a center of said detection area coincides with an average center of said preceding vehicle.

7. A range finder incorporated into a vehicle in which waves are irradiated on a predetermined detection area in front of said vehicle in a scanning manner and detection data including at least positional information on an object to be detected which is located in said detection area is judged and outputted according to said waves reflected on said object to be detected, said range finder comprising:

extraction means for extracting only plural pieces of detection data concerning a preceding vehicle, which have been obtained when said vehicle runs on the same straight line as that on which said preceding vehicle runs, as effective data for a predetermined period of time;

comparing means for comparing an average center of said preceding vehicle with a center position of said detection area; and processing means for detecting deviation of said detection area from an appropriate position.

8. A range finder as claimed in claim 6, said range finder further comprising:

mode change means for changing over a collecting time to collect said effective data between a long collecting time mode and a short collecting time mode.

9. A range finder as claimed in claim 7, said range finder further comprising:

mode change means for changing over a collecting time to collect said effective data between a long collecting time mode and a short collecting time mode.

10. A range finder as claimed in claim 6, said range finder further comprising:

processing means for judging that said vehicle and said preceding vehicle are running straight on the same straight line under the condition that a running direction of said vehicle detected by a sensor when collecting detection data is straight and also under the condition that a running direction of said vehicle detected by said sensor after a predetermined time has passed from the time of collecting detection data is straight; and data exclusion means for excluding detection data of said preceding vehicle not satisfying the above conditions as unavailable data.

11. A range finder as claimed in claim 7, said range finder further comprising:

processing means for judging that said vehicle and said preceding vehicle are running straight on the same straight line under the condition that a running direction of said vehicle detected by a sensor when collecting detection data is straight and also under the condition that a running direction of said vehicle detected by said sensor after a predetermined time has passed from the time of collecting detection data is straight; and data exclusion means for excluding detection data of said preceding vehicle not satisfying the above conditions as unavailable data.

12. A range finder as claimed in claim 8, said range finder further comprising:

processing means for judging that said vehicle and said preceding vehicle are running straight on the same straight line under the condition that a running direction of said vehicle detected by a sensor when collecting detection data is straight and also under the condition that a running direction of said vehicle detected by said sensor after a predetermined time has passed from the time of collecting detection data is straight; and exclusion means for excluding detection data of said preceding vehicle not satisfying the above conditions as unavailable data.

13. A range finder as claimed in claim 9, said range finder further comprising:

processing means for judging that said vehicle and said preceding vehicle are running straight on the same straight line under the condition that a running direction of said vehicle detected by a sensor when collecting detection data is straight and also under the condition that a running direction of said vehicle detected by said sensor after a predetermined time has passed from the time of collecting detection data is straight; and exclusion means for excluding detection data of said preceding vehicle not satisfying the above conditions as unavailable data.

14. A range finder as claimed in claim 6, said range finder further comprising:

processing means for judging that said vehicle and said preceding vehicle are running straight on the same straight line under the condition that a running direction of said vehicle detected by a sensor when collecting detection data is straight and also under the condition that a running direction of the said vehicle detected by said sensor is straight when said vehicle has reached a position at which said preceding vehicle was estimated to be located when collecting detection data; and data exclusion means for excluding detection data of said preceding vehicle not satisfying the above conditions as unavailable data.

15. A range finder as claimed in claim 7, said range finder further comprising:

processing means for judging that said vehicle and said preceding vehicle are running straight on the same straight line under the condition that a running direction of said vehicle detected by a sensor when collecting detection data is straight and also under the condition that a running direction of said vehicle detected by said sensor is straight when said vehicle has reached a position at which said preceding vehicle was estimated to be located when collecting detection data; and data exclusion means for excluding detection data of said preceding vehicle not satisfying the above conditions as unavailable data.

16. A range finder as claimed in claim 8, said range finder further comprising:

processing means for judging that said vehicle and said preceding vehicle are running straight on the same straight line under the condition that a running direction of said vehicle detected by a sensor when collecting detection data is straight and also under the condition that a running direction of said vehicle detected by said sensor is straight when said vehicle has reached a position at which said preceding vehicle was estimated to be located when collecting detection data; and data exclusion means for excluding detection data of said preceding vehicle not satisfying the above conditions as unavailable data.

17. A range finder as claimed in claim 9, said range finder further comprising:

processing means for judging that said vehicle and said preceding vehicle are running straight on the same straight line under the condition that a running direction of said vehicle detected by a sensor when collecting detection data is straight and also under the condition that a running direction of said vehicle detected by said sensor is straight when said vehicle has reached a position at which said preceding vehicle was estimated to be located when collecting detection data; and data exclusion means for excluding detection data of said preceding vehicle not satisfying the above conditions as unavailable data.

18. A range finder claimed in claim 6, said range finder further comprising:

processing means for judging that said vehicle and said preceding vehicle are running straight on the same straight line under the condition that a running direction of said vehicle detected by a sensor when collecting detection data is straight and also under the condition that a position of said preceding vehicle in the transverse direction is continuously detected at one of said positions close to each other for a predetermined setting time; and data exclusion means for excluding detection data of said preceding vehicle not satisfying the above conditions as unavailable data.

19. A range finder claimed in claim 7, said range finder further comprising:

processing means for judging that said vehicle and said preceding vehicle are running straight on the same straight line under the condition that a running direction of said vehicle detected by a sensor when collecting detection data is straight and also under the condition that a position of said preceding vehicle in the transverse direction is continuously detected at one of said positions close to each other for a predetermined setting time; and data exclusion means for excluding detection data of said preceding vehicle not satisfying the above conditions as unavailable data.

20. A range finder claimed in claim 8, said range finder further comprising:

processing means for judging that said vehicle and said preceding vehicle are running straight on the same straight line under the condition that a running direction of said vehicle detected by a sensor when collecting detection data is straight and also under the condition that a position of said preceding vehicle in the transverse direction is continuously detected at one of said positions close to each other for a predetermined setting time; and data exclusion means for excluding detection data of said preceding vehicle not satisfying the above conditions as unavailable data.

21. A range finder claimed in claim 9, said range finder further comprising:

processing means for judging that said vehicle and said preceding vehicle are running straight on the same straight line under the condition that a running direction of said vehicle detected by a sensor when collecting detection data is straight and also under the condition that a position of said preceding vehicle in the transverse direction is continuously detected at one of said positions close to each other for a predetermined setting time; and data exclusion means for excluding detection data of said preceding vehicle not satisfying the above conditions as unavailable data.

22. A range finder incorporated into a vehicle in which waves are irradiated on a predetermined detection area in front of said vehicle in a scanning manner and detection data including at least positional information on an object to be detected which is located in the detection area is judged and outputted according to said waves reflected on said object to be detected, said range finder comprising:

observation means for observing time variation of detection data of a reflecting body disposed on both the road sides on which said vehicle is running for a predetermined period of time when said vehicle is running; and processing means for judging that said detection area deviates from an appropriate position when a distance of movement of said reflecting body in the transverse direction exceeds a predetermined value in the observation.

23. A range finder as claimed in claim 6, said range finder further comprising:

processing means for judging that a center of the detection area deviates from an appropriate position in the vertical direction when said object to be detected is not continuously detected in a period of time exceeding a setting time.

24. A range finder as claimed in claim 7, said range finder further comprising:

processing means for judging that a center of the detection area deviates from an appropriate position in the vertical direction when said object to be detected is not continuously detected in a period of time exceeding a setting time.

25. A range finder claimed in claim 10, wherein a steering angle sensor is used as said sensor.

26. A range finder claimed in claim 10, wherein a yaw rate sensor is used as said sensor.

27. A range finder claimed in claim 11, wherein a steering angle sensor is used as said sensor.

28. A range finder claimed in claim 11, wherein a yaw rate sensor is used as said sensor.

29. A range finder claimed in claim 12, wherein a steering angle sensor is used as said sensor.

30. A range finder claimed in claim 12, wherein a yaw rate sensor is used as said sensor.

31. A range finder claimed in claim 13, wherein a steering angle sensor is used as said sensor.

32. A range finder claimed in claim 13, wherein a yaw rate sensor is used as said sensor.

33. A range finder claimed in claim 14, wherein a steering angle sensor is used as said sensor.

34. A range finder claimed in claim 14, wherein a yaw rate sensor is used as said sensor.

35. A range finder claimed in claim 15, wherein a steering angle sensor is used as said sensor.

36. A range finder claimed in claim 15, wherein a yaw rate sensor is used as said sensor.

37. A range finder claimed in claim 16, wherein a steering angle sensor is used as said sensor.

38. A range finder claimed in claim 16, wherein a yaw rate sensor is used as said sensor.

39. A range finder claimed in claim 17, wherein a steering angle sensor is used as said sensor.

40. A range finder claimed in claim 17, wherein a yaw rate sensor is used as said sensor.

41. A range finder claimed in claim 18, wherein a steering angle sensor is used as said sensor.

42. A range finder claimed in claim 18, wherein a yaw rate sensor is used as said sensor.

43. A range finder claimed in claim 19, wherein a steering angle sensor is used as said sensor.

44. A range finder claimed in claim 19, wherein a yaw rate sensor is used as said sensor.

45. A range finder claimed in claim 20, wherein a steering angle sensor is used as said sensor.

46. A range finder claimed in claim 20, wherein a yaw rate sensor is used as said sensor.

47. A range finder claimed in claim 21, wherein a steering angle sensor is used as said sensor.

48. A range finder claimed in claim 21, wherein a steering angle sensor is used as said sensor.

49. A vehicle detection system, comprising:

a scanning device for transmitting signals into a detection area in front of a first vehicle;

a receiving device for receiving signals reflected off of a vehicle in said detection area; and a control device for detecting, based on said reflected signals, a deviation between an axis of said vehicle in said detection area and a center axis of said detection area.

50. A vehicle detection system, comprising:

a scanning device for transmitting signals into a detection area in front of a first vehicle;

a receiving device for receiving signals reflected off of a vehicle in said detection area; and a control device for controlling said system so that a center axis of said detection area coincides with an axis of said vehicle in said detection area.

51. A method of operating a first vehicle, comprising the steps of:

transmitting signals into a detection area in front of said first vehicle;

receiving signals reflected off of a second vehicle in said detection area; and controlling said detection area so that a center axis of said detection area coincides with a center axis of said second vehicle.

52. A method of operating a first vehicle, comprising the steps of:

transmitting signals into a detection area in front of said first vehicle;

receiving signals reflected off of a second vehicle in said detection area; and detecting a deviation between a center axis of said detection area and a center axis of said second vehicle.

* * * * *